(12) United States Patent
Ranganathan et al.

(10) Patent No.: US 7,925,906 B2
(45) Date of Patent: *Apr. 12, 2011

(54) MULTI-VOLTAGE MULTI-BATTERY POWER MANAGEMENT UNIT

(75) Inventors: Sumant Ranganathan, Sunnyvale, CA (US); Pieter Vorenkamp, Laguna Niguel, CA (US); Neil Y. Kim, Laguna Niguel, CA (US); Chun-ying Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 11/166,632

(22) Filed: Jun. 24, 2005

(65) Prior Publication Data
US 2005/0289375 A1 Dec. 29, 2005

Related U.S. Application Data

(60) Provisional application No. 60/583,996, filed on Jun. 29, 2004.

(51) Int. Cl.
*G06F 1/26* (2006.01)
*G06F 1/32* (2006.01)

(52) U.S. Cl. ...................................................... 713/320

(58) Field of Classification Search .......... 713/300–340; 361/90, 92; 323/234, 304, 318; 320/100–167
See application file for complete search history.

(56) References Cited

U.S. PATENT DOCUMENTS

| | | | | |
|---|---|---|---|---|
| 3,767,933 A | * | 10/1973 | Bogue et al. ............... | 307/48 |
| 4,310,606 A | * | 1/1982 | Maida ........................ | 429/93 |
| 4,716,354 A | * | 12/1987 | Hacker ....................... | 320/114 |
| 5,270,946 A | * | 12/1993 | Shibasaki et al. ........... | 713/340 |
| 5,477,123 A | * | 12/1995 | Allen et al. .................. | 320/124 |
| 5,519,261 A | * | 5/1996 | Stewart ....................... | 307/87 |
| 5,621,301 A | * | 4/1997 | Allen et al. .................. | 320/124 |
| 5,637,980 A | * | 6/1997 | Wu ............................. | 320/128 |
| 5,640,078 A | * | 6/1997 | Kou et al. .................... | 320/124 |
| 5,684,384 A | * | 11/1997 | Barkat et al. ................ | 307/66 |
| 5,867,377 A | * | 2/1999 | Suranyi ....................... | 363/60 |
| 6,078,165 A | * | 6/2000 | Ashtiani et al. ............. | 320/116 |

(Continued)

OTHER PUBLICATIONS

Freescale Semiconductor Technical Data, MC12783 Power Management and Audio Circuit, Document No. MC13783/D, Rev. 3.4, pp. 1-50, Mar. 2007.

(Continued)

*Primary Examiner* — Thomas Lee
*Assistant Examiner* — Mohammed H Rehman
(74) *Attorney, Agent, or Firm* — McAndrews, Held & Malloy, Ltd.

(57) ABSTRACT

A system and method for implementing a multi-voltage multi-battery power management integrated circuit. Various aspects of the present invention provide a power management integrated circuit. The power management IC may comprise a first regulator module that receives a first battery power signal from a first battery characterized by a first battery voltage and outputs a first regulated power signal, based at least in part on the first battery power signal. The power management IC may also comprise a second regulator module that receives a second battery power signal from a second battery characterized by a second battery voltage and outputs a second regulated power signal, based at least in part on the second battery power signal. The second battery voltage may, for example, be substantially different than the first battery voltage. The power first and second regulated power signals may, for example, correspond to substantially different power supply voltages.

38 Claims, 3 Drawing Sheets

U.S. PATENT DOCUMENTS

| | | | | |
|---|---|---|---|---|
| 6,081,096 | A * | 6/2000 | Barkat et al. | 320/124 |
| 6,172,479 | B1 * | 1/2001 | Barton | 320/121 |
| 6,268,711 | B1 * | 7/2001 | Bearfield | 320/117 |
| 6,583,523 | B1 * | 6/2003 | Bhate | 307/86 |
| 6,839,854 | B2 * | 1/2005 | Nguyen | 713/300 |
| 6,865,682 | B1 * | 3/2005 | Talbot et al. | 713/300 |
| 6,914,349 | B2 * | 7/2005 | Rajagopalan | 307/65 |
| 6,948,079 | B2 * | 9/2005 | Zhang et al. | 713/300 |
| 7,000,125 | B2 * | 2/2006 | Chapuis et al. | 713/300 |
| 7,009,363 | B2 * | 3/2006 | Beals et al. | 320/117 |
| 7,085,943 | B2 * | 8/2006 | Chun et al. | 713/300 |
| 7,176,654 | B2 * | 2/2007 | Meyer et al. | 320/110 |
| 7,342,381 | B2 * | 3/2008 | Johnson et al. | 320/136 |
| 2004/0263118 | A1 * | 12/2004 | Breen et al. | 320/116 |
| 2005/0285575 | A1 * | 12/2005 | Kim et al. | 323/234 |
| 2005/0286191 | A1 * | 12/2005 | Vorenkamp et al. | 361/90 |
| 2005/0286192 | A1 * | 12/2005 | Ranganathan et al. | 361/90 |
| 2005/0289375 | A1 * | 12/2005 | Ranganathan et al. | 713/300 |
| 2006/0136757 | A1 * | 6/2006 | Chen et al. | 713/300 |

OTHER PUBLICATIONS

Philips Semiconductors, PCF50606HN/xA/N1, PCF50606HN/xB/N1, PCF50605HN/xA/N1, PCF50605HN/xB/N1 Controller for Power Supply and Battery Management, Preliminary Specification, Rev. 2.2, pp. 1-136, Apr. 9, 2004.

Philips Semiconductors, Longer battery life and smaller phones, Philips highly intergrated power management unit PCF50611 for mid-range mobile applications, 2 pgs., Sep. 2005.

Philips Semiconductors, All-in-one power management for feature-rich phones, Philips single-chip power management unit PCF50626 for feature-rich handsets, 4 pgs., Jan. 2006.

Texas Instruments, Power Management IC for LI-ION Powered Systems, TPS65020, SLVS607A, 48 pages, Sep. 2005, Revised Apr. 2006.

* cited by examiner

MULTI-VOLTAGE MULTI-BATTERY POWER MANAGEMENT UNIT

CROSS-REFERENCE TO RELATED APPLICATIONS/INCORPORATION BY REFERENCE

This patent application is related to and claims priority from provisional patent application Ser. No. 60/583,996, filed Jun. 29, 2004, and entitled "MULTI-VOLTAGE MULTI-BATTERY POWER MANAGEMENT UNIT," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Various components of electrical systems may utilize power at multiple voltage levels. Power management circuitry may, for example, receive power from a battery, or a plurality of batteries at a common voltage, and provide regulated output power to various system components. A power management unit may, for example, utilize a power regulator integrated circuit to regulate the output power. Such a power regulator integrated circuit may, for example, output electrical power having desired characteristics directly. Such a power regulator integrated circuit may alternatively, for example, output electrical power signals that cause additional power supply circuitry coupled to the power regulator integrated circuit to output electrical power having desired characteristics.

Converting an input voltage to a regulated output voltage, particularly where there is a substantial disparity between the input voltage and the regulated output voltage, may result in energy-inefficient power supply operation. For example, various power supply circuit configurations (e.g., linear regulators and various switching regulators) have respective energy-efficiency characteristics, which may depend on the power regulation demands of a particular power regulation scenario.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and method for implementing a multi-voltage multi-battery power management integrated circuit, substantially as shown in and/or described in connection with at least one of the figures, as set forth more completely in the claims.

These and other advantages, aspects and novel features of the present invention, as well as details of illustrative aspects thereof, will be more fully understood from the following description and drawings.

DETAILED DESCRIPTION OF THE INVENTION

Figure 1:
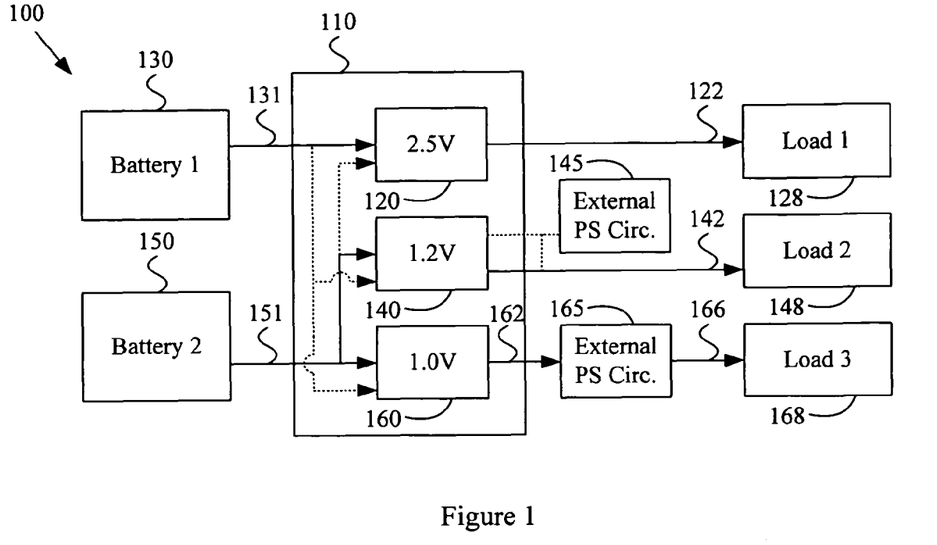
FIG. 1 illustrates an exemplary multi-battery system comprising a power management integrated circuit, in accordance with various aspects of the present invention.

FIG. 1 illustrates an exemplary multi-battery system 100 comprising a power management integrated circuit 110, in accordance with various aspects of the present invention. The system 100 may comprise any of a large variety of system characteristics. For example and without limitation, the system 100 may comprise characteristics of a portable communication system (e.g., a portable phone or portable e-mail device), a portable computing device, a portable media playing device, etc. Accordingly, the scope of various aspects of the present invention should not be limited by characteristics of a particular multi-battery system.

The following discussion may generally refer to one or more "modules" that perform various functions. It should be noted that a "module" may be implemented in hardware, software or a combination thereof. Further, portions of modules may be shared. For example, a first module may share various hardware and/or software components with a second module. Accordingly, the scope of various aspects of the present invention should not be limited by characteristics of a specific implementation of a module or by arbitrary boundaries between modules.

The power management IC 110 (which may also be referred to herein as a "power management unit") may comprise a first voltage regulator module 120 coupled to a first battery 130. The first voltage regulator module 120 may, for example, receive a first battery power signal 131 from the first battery 130. The first battery power signal 131 may be characterized by a first battery voltage. Note that the first battery power signal 131 may, for example, be processed by intervening circuitry (e.g., filter circuitry) between the first battery 130 and the first voltage regulator module 120. Such intervening circuitry, if it exists, may be internal or external to the power management IC 110.

The first voltage regulator module 120 may process the first battery power signal 131 to generate a first regulated power signal 122. The first regulated power signal 122 may, for example, correspond to a first output power characterized by a first output voltage. Note that the first regulated power signal 122 may correspond to a first output power in any of a variety of manners, three of which are illustrated in FIG. 1.

For example, in the exemplary system 100 of FIG. 1, the first regulated power signal 122 is the same as the first output power, which is communicated to and utilized by the first load 128. In the exemplary system 100, the first voltage regulator module 120 outputs the first regulated power signal 122 (and thus the first output power) without interacting with electrical components external to the power management IC 110. Two other non-limiting exemplary illustrations will be provided later.

The first voltage regulator module 120 may comprise characteristics of any of a variety of voltage regulator circuits. For example, the first voltage regulator module 120 may comprise characteristics of at least a front-end portion (if not a whole portion) of a linear voltage regulator, a switching regulator (e.g., a buck converter, boost converter, buck-boost converter, charge pump, etc.), or other types of known or yet to be developed regulator circuits. Accordingly, the scope of various aspects of the present invention should not be limited by characteristics of a particular type of voltage regulator circuit.

The first battery 130 may comprise characteristics of any of variety of batteries. For example and without limitation, the first battery 130 may comprise communication and/or internal power regulation capability. Such communication capability may, for example, comprise capability to communicate using an analog signal and/or digital data. The scope of various aspects of the present invention should not be limited by characteristics of a particular type of battery.

The first load 128, and also the second load 148 and third load 168, may comprise characteristics of any of a variety of power-consuming loads, depending on the nature of the system 100. For example and without limitation, the first load 128 may comprise a microprocessor or memory device. The first load 128 may, for example, comprise a communication circuit or user interface circuit. The first load 128 may, for example, comprise a control circuit or sensor circuit. Accordingly, the scope of various aspects of the present invention should not be limited by characteristics of a particular type of power-consuming load.

As illustrated by the dashed portion of the second battery power signal 151, the first voltage regulator module 120 may also receive the second battery power signal 151 from the second battery 150. In a non-limiting exemplary scenario, the first voltage regulator module 120 may be adapted to process the second battery power signal 151 instead of (or in addition to) the first battery power signal 131 (e.g., when the first battery power signal 131 is inadequate for the needs of the first power regulator module 120 or other circuitry coupled thereto).

The exemplary power regulator IC 110 may also comprise a second voltage regulator module 140. The second voltage regulator module 140 may, for example, receive a second battery power signal 151 from a second battery 150. The second battery power signal 151 may be characterized by a second battery voltage. The second battery voltage may, for example, be substantially different than the first battery voltage discussed previously (e.g., the first and second batteries may be designed to provide power at different respective voltage levels). Note that the second battery power signal 151 may, for example, be processed by intervening circuitry (e.g., filter circuitry) between the second battery 150 and the second voltage regulator module 140. Such intervening circuitry, if it exists, may be internal or external to the power management IC 110.

The second voltage regulator module 140 may process the second battery power signal 151 to generate a second regulated power signal 142. The second regulated power signal 142 may, for example, correspond to a second output power characterized by a second output voltage. The second output voltage may, for example, be substantially different than the first output voltage discussed previously (e.g., the first output voltage and second output voltage may be intended to supply power to different respective devices or different respective portions of a device that have different respective voltage level requirements).

Note that the second regulated power signal 142 may correspond to a second output power in any of a variety of manners, three of which are illustrated in FIG. 1. For example, as discussed previously with regard to the first regulated power signal 122, the second regulated power signal 142 may be the same as the second output power, which is communicated to and utilized by the second load 148. In the exemplary system 100, the second voltage regulator module 140, in outputting the second regulated power signal 142 (and thus the second output power) to the second load 148, interacts with external power circuitry 145. Such external power circuitry 145 may comprise characteristics of any of a variety of power circuitry. For example and without limitation, the power circuitry 145 may comprise various electrical components arranged in a boost-converter configuration.

As shown by dashed lines in the exemplary system 100 of FIG. 1, the second voltage regulator module 140 may, for example, interact with the external power circuitry 145 through the line communicating the second regulated power signal 142 and/or through one or more separate signal lines. The scope of various aspects of the present invention should not be limited by characteristics of any particular interaction between the second voltage regulator module 140 (or other voltage regulator modules) and external power circuitry.

As with the first voltage regulator module 120, the second voltage regulator module 140 may comprise characteristics of any of a variety of voltage regulator circuits. For example, the second voltage regulator module 140 may comprise characteristics of a linear voltage regulator, a switching regulator (e.g., a buck converter, boost converter, buck-boost converter, charge pump, etc.) or other types of known or yet to be developed regulator circuits. Accordingly, the scope of various aspects of the present invention should not be limited by characteristics of a particular type of power regulator circuit.

The second battery 140 may comprise characteristics of any of variety of batteries. For example and without limitation, the second battery 140 may comprise communication and/or internal power regulation capability. Such communication capability may, for example, comprise capability to communicate using an analog signal and/or digital data. The scope of various aspects of the present invention should not be limited by characteristics of a particular type of battery.

As illustrated by the dashed portion of the first battery power signal 131, the second voltage regulator module 140 may also receive the first battery power signal 131 from the first battery 130. In a non-limiting exemplary scenario, the second voltage regulator module 140 may be adapted to process the first battery power signal 131 instead of (or in addition to) the second battery power signal 151 (e.g., when the second battery power signal 151 is inadequate for the needs of the second power regulator module 140 or other circuitry coupled thereto).

The exemplary power regulator IC 110 may also comprise a third voltage regulator module 160. The third voltage regulator module 160 may, for example, receive the second battery power signal 151 from the second battery 150. As mentioned previously, the second battery power signal 151 may be characterized by a second battery voltage, which may, for example, be substantially different than the first battery voltage discussed previously. Note that the second battery power signal 151 may, for example, be processed by intervening circuitry (e.g., filter circuitry) between the second battery 150 and the third voltage regulator module 160. Such intervening circuitry, if it exists, may be internal or external to the power management IC 110.

The third voltage regulator module 160 may process the second battery power signal 151 to generate a third regulated power signal 162. The third regulated power signal 162 may, for example, correspond to a third output power 166 characterized by a third output voltage. The third output voltage may, for example, be substantially different than the first and second output voltages discussed previously (e.g., the first output voltage, second output voltage and third output voltage may be intended to supply power to different respective devices or different respective portions of a device that have different respective voltage level requirements).

Note that the third regulated power signal 162 may correspond to a third output power in any of a variety of manners, three of which are illustrated in FIG. 1. For example, as discussed previously with regard to the first regulated power signal 122, the third regulated power signal 162 may be the same as the third output power and may be developed entirely internal to the integrated circuit 110. Also for example, as discussed previously with regard to the second regulated power signal 142, the third regulated power signal 162 may be the same as the third output power and may be developed in conjunction with circuitry external and tangential to the integrated circuit 110.

In the exemplary system 100, the third voltage regulator module 160 outputs the third regulated power signal 162 to external power circuitry 165, which in turn, outputs the third output power 166 to the third load 168. Such external power circuitry 165 may comprise characteristics of any of a variety of power circuitry. For example and without limitation, the power circuitry 165 may comprise various electrical components arranged in a buck-converter configuration.

As illustrated by the dashed portion of the first battery power signal 131, the third voltage regulator module 160 may also receive the first battery power signal 131 from the first battery 130. In a non-limiting exemplary scenario, the third voltage regulator module 160 may be adapted to process the first battery power signal 131 instead of (or in addition to) the second battery power signal 151 (e.g., when the second battery power signal 151 is inadequate for the needs of the third power regulator module 160 or other circuitry coupled thereto).

As mentioned previously, the first, second and third exemplary voltage regulator modules 120, 140, 160 may interact with any of a variety of power circuitry external to the integrated circuit 110. Accordingly, the scope of various aspects of the present invention should not be limited by characteristics of any particular interaction between the third voltage regulator module 160 (or other voltage regulator modules) and external power circuitry.

As with the first and second voltage regulator modules 120, 140, the third voltage regulator module 160 may comprise characteristics of any of a variety of voltage regulator circuits. For example, the third voltage regulator module 160 may comprise characteristics of a linear voltage regulator, a switching regulator (e.g., a buck converter, boost converter, buck-boost converter, charge pump, etc.) or other types of known or yet to be developed regulator circuits. Accordingly, the scope of various aspects of the present invention should not be limited by characteristics of a particular type of power regulator circuit.

In a non-limiting exemplary scenario, the first voltage regulator module 120 may receive a first battery power signal 131 of approximately 2.5V from the first battery 130 and output a first regulated power signal 122 that corresponds to a first output power, which is characterized by a first output voltage of 2.5V. In this example, the first regulated power signal 122 corresponds to (and in fact, equals) the first output power that the first voltage regulator module 120 provides to the first load 128. Also in this example, the first voltage regulator module 120 does not interact with power circuitry external to the power regulator IC 110 to regulate the power provided to the first load 128.

Continuing the non-limiting exemplary scenario, the second voltage regulator module 140 may receive a second battery power signal 151 of approximately 1.1V from the second battery 150 and output a second regulated power signal 142 that corresponds to a second output power, which is characterized by 1.2V. In this example, the second regulated power signal 142 corresponds to (and in fact, equals) the second output power that the second voltage regulator module 140 provides to the second load 148. Also in this example, the second voltage regulator module 140 interacts with external power circuitry 145 (e.g., components in a tangential boost-converter configuration) to regulate the power provided to the second load 148.

Continuing the non-limiting exemplary scenario, the third voltage regulator module 160 may receive the second battery power signal 151 of approximately 1.1 V from the second battery 150 and output a third regulated power signal 162 that corresponds to a third output power 166, which is characterized by 1.0V. In this example, the third regulated power signal 162 corresponds to (but may not equal) the third output power 166 provided to the third load 168. Also in this example, the third voltage regulator module 160 interacts with external power circuitry 165 (e.g., components in an in-line buck-converter configuration) to regulate the power provided to the third load 168.

It should be noted that the exemplary system 100, including the exemplary power regulator IC 110, illustrated in FIG. 1 and discussed previously was presented to provide specific examples of generally broader aspects of the present invention. For example and without limitation, the voltage regulator modules 120, 140, 160 may alternatively (or additionally) perform current regulation or regulation of other known aspects of electrical power. Accordingly, the scope of various aspects of the present invention should not be limited by characteristics of the exemplary system 100.

Figure 2:
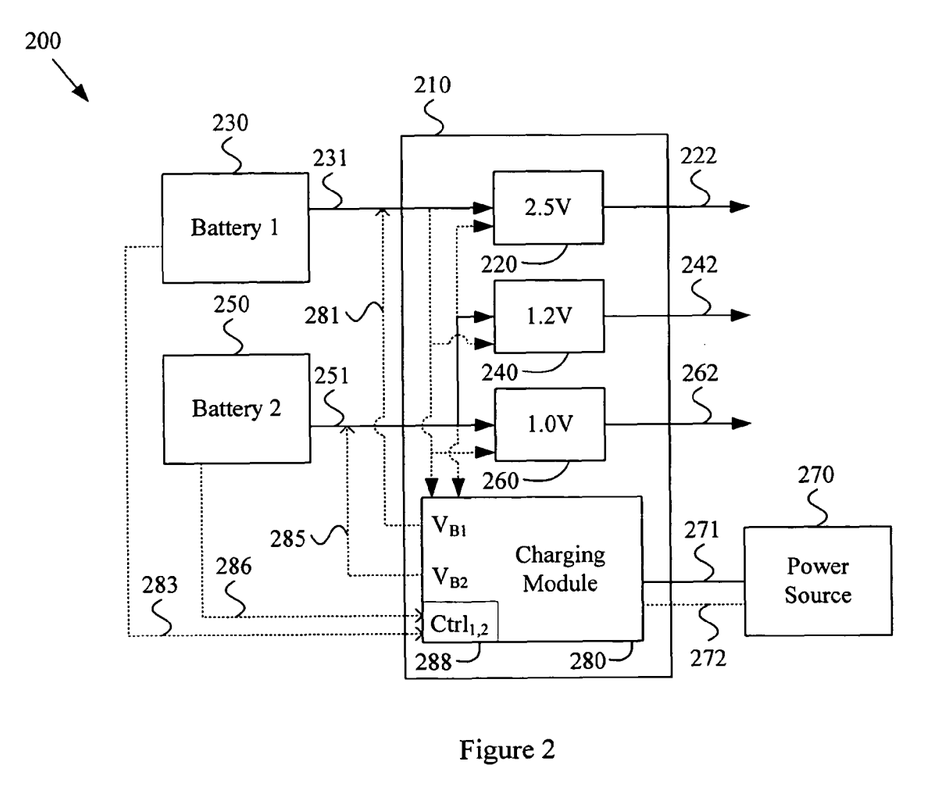
FIG. 2 illustrates an exemplary multi-battery system comprising a power management integrated circuit that comprises a charging module, in accordance with various aspects of the present invention.

FIG. 2 illustrates an exemplary multi-battery system 200 comprising a power management integrated circuit 210 that comprises a charging module, in accordance with various aspects of the present invention. The exemplary system 200 may, for example and without limitation, share various characteristics with the exemplary system 100 illustrated in FIG. 1 and discussed previously.

For example, the first battery 230 and second battery 250 may share various characteristics with the first battery 130 and second battery 150 of the exemplary system 100 of FIG. 1. Also for example, the first voltage regulator module 220, second voltage regulator module 240 and third voltage regulator module 260 may share various characteristics with the first voltage regulator module 120, second voltage regulator module 140 and third voltage regulator module 160 of the exemplary system 100 of FIG. 1.

The exemplary system 200 may comprise a power management IC 210. The exemplary power management IC 210 may, for example, comprise a charging module 280. The exemplary charging module 280 may receive a third input power signal 271 from a power source 270. The third input power signal 271 may, for example, be characterized by a third input voltage.

The power source 270 may comprise characteristics of any of a variety of power sources. For example and without limitation, the power source 270 may comprise characteristics of an AC-to-DC power supply (e.g., plugged into a wall outlet). Further for example, the power source 270 may comprise an automobile power source (e.g., plugged into a cigarette lighter socket or other automobile power outlet). The scope of various aspects of the present invention should not be limited by characteristics of a particular power source 270.

The charging module 280 may, for example, process the third input power signal 271 to generate a first battery-charging signal 281. The first battery-charging signal 281 may, for example, correspond to a first charging power utilized to charge the first battery 230. The first battery-charging signal 281 may, for example, correspond to the first charging power in a variety of manners. For example and without limitation, the first battery-charging signal 281 may correspond to the first charging power in a manner similar to the manner in which a regulated power signal 122, 142, 162 from one of the previously-discussed voltage regulator modules 120, 140, 160 corresponds to a respective power output. For example, such correspondence may be based on like identity, or such correspondence may be based on coupled and/or intervening electrical circuitry. In the exemplary system 200, the charging module 280 outputs the first battery-charging signal 281 to the first battery 230. Note however, as mentioned previously, there may be intervening circuitry between the charging module 280 and the first battery 230.

The charging module 280 may, for example and without limitation, comprise voltage regulation circuitry for generating the first battery-charging signal 281 (e.g., based on the third input power signal 271). Such voltage regulation circuitry may, for example and without limitation, share various characteristics with the exemplary voltage regulator modules 120, 140, 160 of the exemplary system 100 illustrated in FIG. 1 and discussed previously. For example, such voltage regulation circuitry may comprise characteristics of linear voltage regulator circuitry, switching regulator circuitry (e.g., a buck converter, boost converter, buck-boost converter, charge pump, etc.), or other types of known or yet to be developed regulator circuitry. Accordingly, the scope of various aspects of the present invention should not be limited by characteristics of a particular type of regulator circuitry.

The charging module 280 may, for example, process the third input power signal 271 to generate a second battery-charging signal 285. The second battery-charging signal 285 may, for example, correspond to a second charging power utilized to charge the second battery 250.

The second battery-charging signal 285 may, for example, correspond to the second charging power in a variety of manners. For example and without limitation, the second battery-charging signal 285 may correspond to the second charging power in a manner similar to the manner in which a regulated power signal 122, 142, 162 from one of the previously-discussed voltage regulator modules 120, 140, 160 corresponds to a respective power output. For example, such correspondence may be based on like identity, or such correspondence may be based on coupled and/or intervening electrical circuitry. In the exemplary system 200, the charging module 280 outputs the second battery-charging signal 285 to the second battery 250. Note however, as mentioned previously, there may be intervening circuitry between the charging module 280 and the second battery 250.

The charging module 280 may, for example and without limitation, comprise voltage regulation circuitry for generating the second battery-charging signal 285 (e.g., based on the third input power signal 271). Such power regulation circuitry may, for example and without limitation, share various characteristics with the exemplary voltage regulator modules 120, 140, 160 of the exemplary system 100 illustrated in FIG. 1 and discussed previously. For example, such power regulation circuitry may comprise characteristics of linear voltage regulator circuitry, switching regulator circuitry (e.g., a buck converter, boost converter, buck-boost converter, charge pump, etc.), or other types of known or yet to be developed regulator circuitry. Accordingly, the scope of various aspects of the present invention should not be limited by characteristics of a particular type of regulator circuitry.

The charging module 280 may, for example, comprise a control interface 288. The control interface 288 may, for example, receive control signals related to the control of battery-charging signals. The charging module 280 may, for example, process control signals received through the control interface 288 to control various characteristics of battery-charging signals.

In the exemplary system 200 illustrated in FIG. 2, the charging module 280 comprises a first control signal input $Ctrl_1$, through which the integrated circuit 210 (e.g., the charging module 280) may receive a first control signal 283 from the first battery 230 (or an alternative source). The charging module 280 may then process the received first control signal 283 to control various characteristics (e.g., voltage) of the first battery-charging signal 281. Also in the exemplary system 200, the charging module 280 comprises a second control signal input $Ctrl_2$, through which the integrated circuit 210 (e.g., the charging module 280) may receive a second control signal 286 from the second battery 250 (or an alternative source). The charging module 280 may then process the received second control signal 286 to control various characteristics (e.g., voltage) of the second battery-charging signal 285.

The first and second control signals 283, 286 may comprise any of a variety of control signal characteristics. For example, the control signals 283, 286 may be analog signals. The control signals 283, 286 may, for example, utilize analog signals to guide operation of the charging module 280 (e.g., indicating a need for charging, indicating a desired voltage level or current level for charging, etc.). Also for example, the control signals may be digital signals (e.g., comprising control data). For example, the first and second control signals 283, 286 may comprise data signals that are multiplexed onto a single communication line. The charging module 280 may then process the received control data to determine various characteristics of the battery-charging signals 281, 285.

Note that as illustrated by the dashed line 272 between the power source 270 and the charging module 280, the power source 270 may communicate one or more additional input power signals 272 that the charging module 280 may utilize to generate one or more corresponding battery-charging signals. In a non-limiting exemplary scenario, the charging module 280 may generate the first battery-charging signal 281 based on the third input power signal 271 received from the power source 270 and generate the second battery-charging signal 285 based on a fourth input power signal 272 received from the power source 270.

Continuing the non-limiting exemplary scenario discussed in the discussion of FIG. 1, the charging module 280 may receive a third input power signal 271 characterized by a voltage of approximately 2.5V from the power source 270. The charging module 280 may then (e.g., open loop or in response to a first control signal 283) generate a first battery-charging signal 281 characterized by 2.5V and provide the first battery-charging signal 281 to the first battery 230. The charging module 280 may also (e.g., open loop or in response to a second control signal 286) generate a second battery-charging signal 285 characterized by 1.1 V and provide the second battery-charging signal 285 to the second battery 250.

The previous discussion generally focused on the charging module 280 receiving the third input power signal 271 from the power source 270 and processing such signal 271 to generate first and second battery-charging signals 281, 285. As illustrated by respective dashed portions of the first battery power signal 231 and the second battery power signal 251, the charging module 280 may, in various non-limiting exemplary scenarios, receive such power signals 231, 251 from the first battery 230 and/or the second battery 250. For example, the charging module 280 may process the first battery power signal 231 to generate the second battery-charging signal 285, or the charging module 280 may process the second battery power signal 251 to generate the first battery-charging signal 281. In other words, the charging module 280 may be adapted to exchange power (or energy) between the batteries 230, 250. In a non-limiting exemplary scenario, the charging module 280 may be adapted to determine power needs (e.g., predetermined, empirically or analytically) and battery power (or energy) levels or capacities (e.g., predetermined, empirically or analytically), and determine when to perform such power exchanging.

It should be noted that the exemplary system 200, including the exemplary power regulator IC 210, illustrated in FIG. 2 and discussed previously was presented to provide specific examples of generally broader aspects of the present invention. Accordingly, the scope of various aspects of the present invention should not be limited by characteristics of the exemplary system 200.

Figure 3:
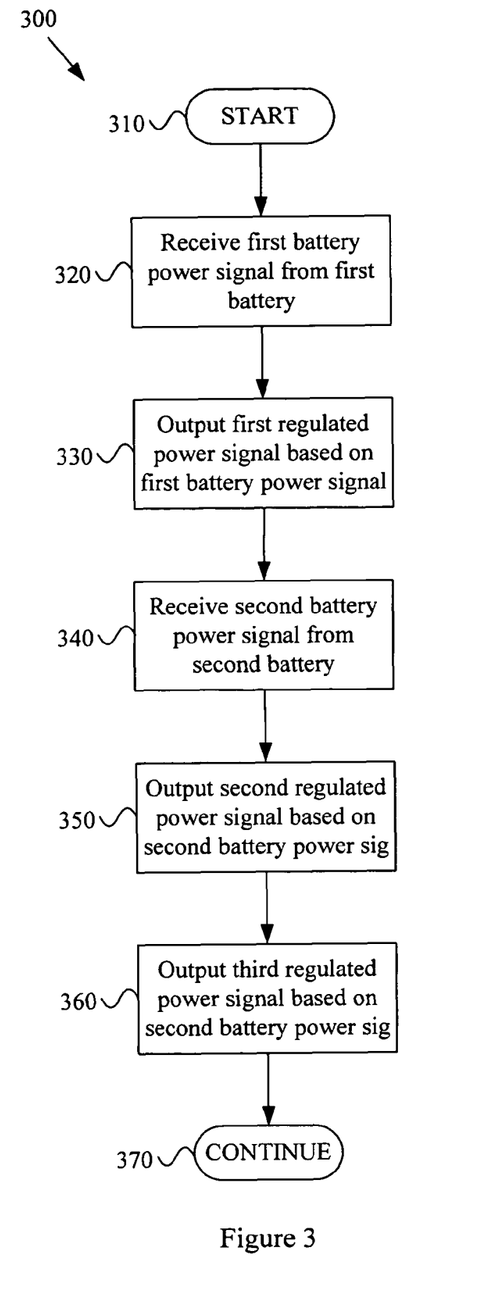
FIG. 3 illustrates a flow diagram of an exemplary method in a power management integrated circuit for controlling output power based on input power supplied from multiple batteries at multiple respective voltages, in accordance with various aspects of the present invention.

FIG. 3 illustrates a flow diagram of an exemplary method 300 in a power management integrated circuit for controlling output power based on input power supplied from multiple batteries at multiple respective voltages, in accordance with various aspects of the present invention.

The exemplary method 300 may begin at step 310. The exemplary method 300 (and other methods illustrated herein) may begin for any of a variety of reasons. For example, the method 300 may begin executing upon a system power-up or reset. Also for example, the method 300 may begin executing in response to a command from a user, another system component or another system. Further for example, the method 300 may begin upon the insertion of a battery into a system implementing the method 300 or upon the connection of a power supply to such a system. Accordingly, the scope of various aspects of the present invention should not be limited by characteristics of any particular initiating causes or conditions.

The exemplary method 300 may, at step 320, comprise receiving a first battery power signal characterized by a first battery voltage from a first battery. The exemplary method 300 may, at step 330, comprise outputting a first regulated power signal, based at least in part on the first battery power signal, that corresponds to a first output power, which is characterized by a first output voltage. For example and without limitation, steps 320 and 330 may share various functional characteristics with the exemplary first voltage regulator module 120 of the exemplary integrated circuit 110 illustrated in FIG. 1 and discussed previously.

For example, the first battery may comprise characteristics of any of a variety of battery types. For example and without limitation, the first battery may comprise communication and/or internal power regulation capability. Such communication capability may, for example, comprise capability to communicate using an analog signal and/or digital data. The scope of various aspects of the present invention should not be limited by characteristics of a particular type of battery.

Step 330 may, for example, comprise processing the first battery power signal (e.g., as received at step 320) to generate and output the first regulated power signal. The first regulated power signal may, for example, correspond to a first output power characterized by a first output voltage. Note that the first regulated power signal may correspond to a first output power in any of a variety of manners, some of which were discussed previously with regard to the exemplary system 100 of FIG. 1. For example, the first regulated power signal may be the same signal as the first output power. Also for example, the first regulated power signal may be processed by intervening circuitry, tangential circuitry or other circuitry coupled to the power management integrated circuit. Such intervening, tangential or coupled circuitry may, for example as discussed previously, comprise characteristics of any of a variety of power circuits (e.g., regulator circuitry, filter circuitry, etc.).

Step 330 may, for example, comprise generating the first regulated power signal using any of a variety of circuitry. For example and without limitation, step 330 may comprise generating the first regulated power signal using at least a front-end portion (if not a whole portion) of various regulator circuitry. Such regulator circuitry may, for example, comprise linear regulator circuitry, switching power supply circuitry (e.g., buck converter circuitry, boost converter circuitry, buck-boost converter circuitry, charge pump circuitry, etc.), or other types of known or yet to be developed regulator circuitry. Accordingly, the scope of various aspects of the present invention should not be limited by characteristics of a particular type of circuitry that may be utilized to implement step 330.

The exemplary method 300 may, at step 340, comprise receiving a second battery power signal characterized by a second battery voltage from a second battery, wherein the second battery voltage is substantially different than the first battery voltage. The exemplary method 300 may, at step 350, comprise outputting a second regulated power signal, based at least in part on the second battery power signal (e.g., as received at step 340), that corresponds to a second output power, which is characterized by a second output voltage. The second output voltage may, for example, be substantially different than the first output voltage discussed previously with regard to step 330.

For example and without limitation, steps 340 and 350 may share various characteristics with exemplary steps 320 and 330, and may share various functional characteristics the exemplary second voltage regulator module 140 of the exemplary integrated circuit 110 illustrated in FIG. 1 and discussed previously.

The exemplary method 300 may, at step 360, comprise outputting a third regulated power signal, based at least in part on the second battery power signal (e.g., as received at step 340), that corresponds to a third output power, which is characterized by a third output voltage. The third output voltage may, for example, be substantially different than the first and second output voltages discussed previously with regard to steps 330 and 350.

For example and without limitation, step 360 may share various characteristics with exemplary steps 330 and 350, and may share various functional characteristics the exemplary third voltage regulator module 160 of the exemplary integrated circuit 110 illustrated in FIG. 1 and discussed previously.

The exemplary method 300 may, at step 370, comprise performing continued processing. Step 370, and other continued processing steps discussed herein, may comprise performing any of a large variety of continued processing. For example and without limitation, step 370 may comprise directing execution flow of the exemplary method 300 back up to step 320 for continued processing. Step 370 may alternatively, for example, comprise directing execution flow of the exemplary method 300 back up to step 320 in response to an event (e.g., a timeout event or received signal). Step 370 may, for example, comprise performing additional processing related to the output regulated power signals and/or other output signals. Accordingly, the scope of various aspects of the present invention should not be limited by characteristics of any particular continued processing.

It should be noted that the exemplary method 300 illustrated in FIG. 3 and discussed previously was presented to provide specific examples of generally broader aspects of the present invention. Accordingly, the scope of various aspects of the present invention should not be limited by characteristics of the exemplary method 300.

Figure 4:
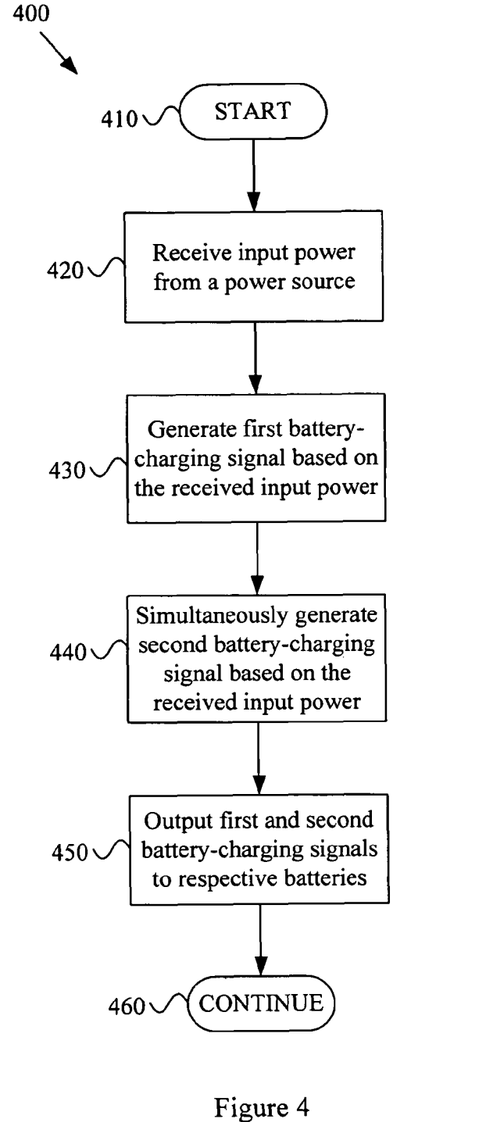
FIG. 4 illustrates a flow diagram of an exemplary method in a power management integrated circuit for managing the power in multiple batteries having multiple respective voltages, in accordance with various aspects of the present invention.

FIG. 4 illustrates a flow diagram of an exemplary method 400 in a power management integrated circuit for managing the power in multiple batteries having multiple respective voltages, in accordance with various aspects of the present invention. The exemplary method 400 may share various functional aspects with the exemplary charging module 280 of the power management integrated circuit 210 illustrated in FIG. 2 and discussed previously.

The exemplary method 400 may, for example and without limitation, be implemented in the same power management integrated circuit with the exemplary method 300 illustrated in FIG. 3 and discussed previously. For example, exemplary method 400 and exemplary method 300 may be implemented in the same power management integrated circuit simultaneously.

The exemplary method 400 may, at step 420, comprise receiving input power from a power source. The input power may, for example, be characterized by an input voltage. The power source may comprise characteristics of any of a variety of power sources. For example and without limitation, the power source may comprise characteristics of an AC-to-DC power supply (e.g., plugged into a wall outlet). Further for example, the power source may comprise an automobile power source (e.g., plugged into a cigarette lighter socket or other automobile power outlet). The scope of various aspects of the present invention should not be limited by characteristics of a particular power source.

The exemplary method 400 may, at step 430, comprise generating a first battery-charging signal, based at least in part on the received input power (e.g., received at step 420), where the first battery-charging signal corresponds to first charging power utilized to charge a first battery.

The first battery-charging signal may, for example, correspond to the first charging power in a variety of manners. For example and without limitation, the first battery-charging signal may correspond to the first charging power in a manner similar to the manner in which a regulated power signal 122, 142, 162 from one of the previously-discussed voltage regulator modules 120, 140, 160 corresponds to a respective power output signal. For example, such correspondence may be based on like identity, or such correspondence may be based on tangential, intervening, or other coupled electrical circuitry. In other words, there may (but not necessarily) be intervening circuitry between the first battery-charging signal and the first charging power that is utilized to charge the first battery.

Step 430 may, for example and without limitation, comprise utilizing voltage regulation circuitry for generating the first battery-charging signal. Such voltage regulation circuitry may, for example and without limitation, share various characteristics with the exemplary voltage regulator modules 120, 140, 160 of the exemplary system 100 illustrated in FIG. 1 and discussed previously. For example, such voltage regulation circuitry may comprise characteristics of linear voltage regulator circuitry, switching regulator circuitry (e.g., a buck converter, boost converter, buck-boost converter, charge pump, etc.), or other types of known or yet to be developed regulator circuitry. Accordingly, the scope of various aspects of the present invention should not be limited by characteristics of a particular type of voltage regulator circuitry.

The exemplary method 400 may, at step 440, comprise generating a second battery-charging signal, based at least in part on the received input power (e.g., as received at step 420). Step 440 may, for example and without limitation, share various characteristics with step 430 discussed above.

In the exemplary method 400 illustrated in FIG. 4, step 440 bases the second battery-charging signal on the input received at step 420. Note, however, that step 440 may alternatively comprise generating the second battery-charging signal based, at least in part, on received input power that is different than the input power received at step 420.

The exemplary method 400 may, at step 450, comprise outputting the first and second battery-charging signals (e.g., as generated at steps 430 and 440). Step 450 may comprise outputting the battery-charging signals to a variety of devices. For example and without limitation, step 450 may comprise outputting the battery-charging signals directly to respective batteries. Also for example, step 450 may comprise outputting the battery-charging signals to charging circuitry external to the power management integrated circuit, where the charging circuitry, in turn, generates and provides charging power to the respective batteries. The scope of various aspects of the present invention should not be limited by a particular immediate destination for the battery-charging signals output by step 450.

It should be noted that the exemplary method 400 illustrated in FIG. 4 and discussed previously was presented to provide specific examples of generally broader aspects of the present invention. Accordingly, the scope of various aspects of the present invention should not be limited by characteristics of the exemplary method 400.

Figure 5:
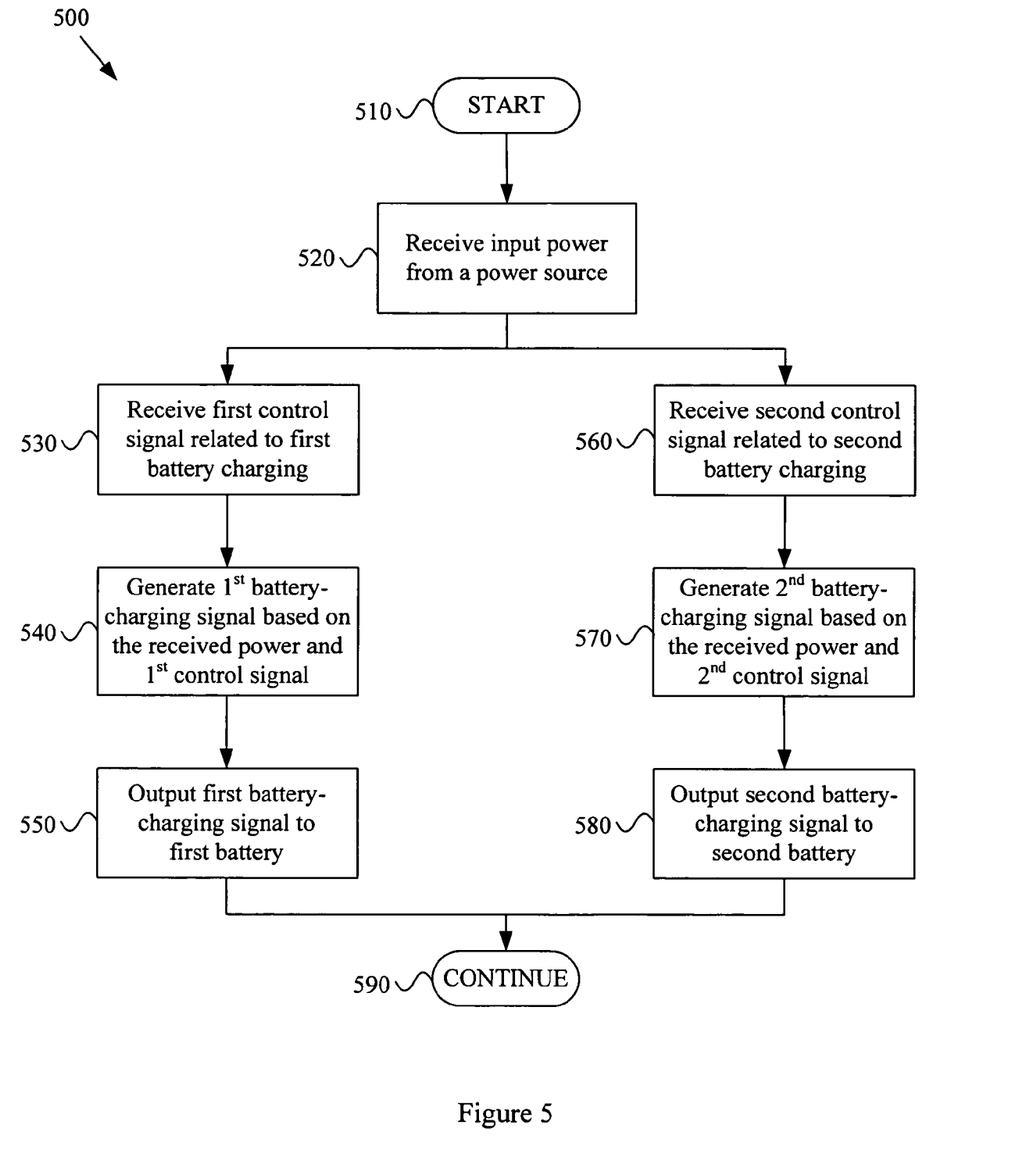
FIG. 5 illustrates a flow diagram of an exemplary method in a power management integrated circuit for managing the power in multiple batteries having multiple respective voltages, in accordance with various aspects of the present invention.

FIG. 5 illustrates a flow diagram of an exemplary method 500 in a power management integrated circuit for managing the power in multiple batteries having multiple respective voltages, in accordance with various aspects of the present invention. The exemplary method 500 may share various characteristics with the exemplary method 400 illustrated in FIG. 4 and discussed previously, and with various functional aspects of the exemplary charging module 280 of the power management integrated circuit 210 illustrated in FIG. 2 and discussed previously.

The exemplary method 500 may, for example and without limitation, be implemented in the same power management integrated circuit with one or both the exemplary methods 300, 400 illustrated in FIGS. 3-4 and discussed previously.

For example, exemplary method 500 and exemplary methods 300 and 400 may be implemented in the same power management IC simultaneously.

The exemplary method 500 may, at step 520, comprise receiving input power from a power source. Exemplary step 520 may, for example and without limitation, share various characteristics with step 420 of the exemplary method 400 illustrated in FIG. 4 and discussed previously.

Execution of the exemplary method 500 may, for example, proceed simultaneously on parallel paths, each of which starts at steps 530 and 560, respectively. Note that this is an exemplary flow, and such simultaneity is by no means required. Further for example, such simultaneity, or portions thereof, may only be pseudo-simultaneous (e.g., processing on each parallel path may share processing resources in a time-sharing implementation). Accordingly, the scope of various aspects of the present invention should not be limited by characteristics of a simultaneous or pseudo-simultaneous implementation.

The exemplary method 500 may, at step 530, comprise receiving a first control signal from a source external to the power management integrated circuit, where the first control signal is related to charging a first battery. For example and without limitation, step 530 may comprise receiving such a control signal through a control interface (e.g., such as exemplified by the control interface 288 illustrated in FIG. 2 and discussed previously).

As discussed previously with regard to the exemplary system 200 illustrated in FIG. 2, the first control signal may comprise any of a variety of control signal characteristics. For example, the first control signal may be an analog signal. The first control signal may, for example, comprise an analog signal utilized to guide operation of a charging module (e.g., indicating a need for charging, indicating a desired voltage or current level for charging, etc.). Also for example, the first control signal may comprise a digital signal (e.g., comprising control data). For example, the first control signal may comprise a data signal that is multiplexed onto a single communication line with one or more other digital signals (e.g., a second control signal). In general, the first control signal may comprise any of a variety of control signal characteristics. Accordingly, the scope of various aspects of the present invention should not be limited by any particular signal characteristics.

The source from which the first control signal is received may comprise any of a variety of sources. For example, step 530 may comprise receiving the first control signal from the first battery. Also for example, step 530 may comprise receiving the first control signal from circuitry associated with the charging of the first battery (e.g., power monitor circuitry or power control circuitry). The scope of various aspects of the present invention should not be limited by characteristics of a particular source for the first control signal.

The exemplary method 500 may, at step 540, comprise generating a first battery-charging signal based, at least in part, on the first control signal (e.g., as received at step 530). For example, the first battery-charging signal may correspond to first charging power being utilized to charge the first battery. Exemplary step 540 may, for example and without limitation, share various characteristics with step 430 of the exemplary method 400 illustrated in FIG. 4 and discussed previously.

Additionally, step 540 may comprise processing the received first control signal to control various characteristics (e.g., voltage) of the first battery-charging signal. For example, in an exemplary scenario where the first control signal comprises information (e.g., analog or digital information) indicative of a voltage level received by the first battery, step 540 may comprise determining characteristics of the first battery-charging signal that will result in the first battery receiving a particular voltage level.

Step 540 may, for example and without limitation, comprise utilizing voltage regulation circuitry for generating the first battery-charging signal. Such voltage regulation circuitry may, for example and without limitation, share various characteristics with the exemplary voltage regulator modules 120, 140, 160 of the exemplary system 100 illustrated in FIG. 1 and discussed previously. For example, such voltage regulation circuitry may comprise characteristics of linear voltage regulator circuitry, switching regulator circuitry (e.g., a buck converter, boost converter, buck-boost converter, charge pump, etc.), or other types of known or yet to be developed regulator circuitry. Accordingly, the scope of various aspects of the present invention should not be limited by characteristics of a particular type of voltage regulator circuitry.

The exemplary method 500 may, at step 550, comprise outputting the first battery-charging signal. Exemplary step 550 may, for example and without limitation, share various characteristics with step 450 of the exemplary method illustrated in FIG. 4 and discussed previously.

The exemplary method 500 may, at step 560, comprise receiving a second control signal from a source external to the power management integrated circuit, where the second control signal is related to charging a second battery. Exemplary step 560 may, for example and without limitation, share various characteristics with step 530 discussed previously. For example, the second control signal may comprise analog control information and/or digital control information. Further for example, the second control signal may be multiplexed or otherwise combined with the first control signal discussed previously.

The exemplary method 500 may, at step 570, comprise determining a second battery-charging signal based, at least in part, on the second control signal. Exemplary step 570 may, for example and without limitation, share various characteristics with step 540 discussed previously. The exemplary method 500 may, at step 580, comprise outputting the second battery-charging signal. Exemplary step 580 may, for example and without limitation, share various characteristics with step 550 discussed previously.

It should be noted that the exemplary method 500 illustrated in FIG. 5 and discussed previously was presented to provide specific examples of generally broader aspects of the present invention. Accordingly, the scope of various aspects of the present invention should not be limited by characteristics of the exemplary method 500.

In summary, various aspects of the present invention provide a system and method for implementing a multi-voltage multi-battery power management unit. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A power management integrated circuit comprising:
   a first voltage regulator module that operates to receive a first battery power signal characterized by a first battery voltage from a first battery and output a first regulated power signal, based at least in part on the first battery power signal, that corresponds to a first output power characterized by a first output voltage; and a second voltage regulator module that operates to receive a second battery power signal characterized by a second battery voltage from a second battery and output a second regulated power signal, based at least in part on the second battery power signal, that corresponds to a second output power characterized by a second output voltage, wherein the second battery voltage is substantially different from the first battery voltage, and wherein the first battery and the second battery are characterized by substantially different respective nominal voltage levels.

2. The integrated circuit of claim 1, further comprising a battery-charging module that operates to, at least:

receive input power from a power source;

output a first battery-charging signal, based at least in part on the received input power, that corresponds to first charging power at a first charging voltage utilized to charge the first battery; and output a second battery-charging signal, based at least in part on the received input power, that corresponds to second charging power at a second charging voltage utilized to charge the second battery, the second charging voltage substantially different from the first charging voltage.

3. The integrated circuit of claim 2, further comprising a third voltage regulator module that operates to receive a third battery power signal characterized by the second battery voltage from the second battery and output a third regulated power signal, based at least in part on the third battery power signal, that corresponds to a third output power characterized by a third output voltage.

4. The integrated circuit of claim 2, further comprising a control interface through which the integrated circuit operates to receive a first control signal from monitor circuitry and related to the first battery-charging signal and receive a second control signal from monitor circuitry and related to the second battery-charging signal, wherein the battery-charging module operates to determine the first battery-charging signal based at least in part on the first control signal, and determine the second battery-charging signal based at least in part on the second control signal.

5. The integrated circuit of claim 2, further comprising a control interface through which the integrated circuit operates to receive first control data from monitor circuitry and related to the first battery-charging signal and receive second control data from monitor circuitry and related to the second battery-charging signal, wherein the battery-charging module operates to determine the first battery-charging signal based at least in part on the first control data, and determine the second battery-charging signal based at least in part on the second control data.

6. The integrated circuit of claim 2, wherein the battery-charging module further operates to receive first battery input power from the first battery and provide at least a portion of the received battery input power to the second battery.

7. The integrated circuit of claim 2, wherein the battery-charging module further operates to output the first and second battery-charging signals simultaneously.

8. The integrated circuit of claim 5, wherein the first control data indicates a need to charge the first battery, and the second control data indicates a need to charge the second battery.

9. The integrated circuit of claim 5, wherein the control interface operates to receive the first control data and the second control data multiplexed on a single communication line.

10. The integrated circuit of claim 1, further comprising a third voltage regulator module that operates to receive a third battery power signal characterized by the second battery voltage from the second battery and output a third regulated power signal, based at least in part on the third battery power signal, that corresponds to a third output power characterized by a third output voltage.

11. The integrated circuit of claim 10, wherein the third output voltage, second output voltage and first output voltage are substantially different from each other.

12. The integrated circuit of claim 1, wherein the second output voltage is substantially different from the first output voltage.

13. The integrated circuit of claim 1, wherein the first regulated power signal comprises the first output power characterized by the first output voltage.

14. The integrated circuit of claim 1, wherein the first regulated power signal, when applied to an external electrical circuit coupled to the integrated circuit, causes the external electrical circuit to output the first output power.

15. The integrated circuit of claim 14, wherein the external electrical circuit comprises electrical components in at least one of a buck configuration and/or a boost configuration.

16. The integrated circuit of claim 1, wherein the first regulated power signal output from the integrated circuit comprises first output power characterized by the first output voltage, the second regulated power signal output from the integrated circuit comprises second output power characterized by the second output voltage, and the first regulated power signal is independent of the second regulated power signal.

17. The integrated circuit of claim 1, wherein:

the first voltage regulator outputs the first regulated power signal such that an insubstantial disparity exists between the first output voltage corresponding to the first regulated power signal and the first battery voltage of the first battery power signal, and the second voltage regulator outputs the second regulated power signal such that an insubstantial disparity exists between the second output voltage corresponding to the second regulated power signal and the second battery voltage of the second battery power signal.

18. The integrated circuit of claim 1, wherein:

the first voltage regulator outputs the first regulated power signal such that the first output voltage corresponding to the first regulated power signal is substantially equal to the first battery voltage of the first battery power signal, and the second voltage regulator outputs the second regulated power signal such that the second output voltage corresponding to the second regulated power signal is substantially equal to the second battery voltage of the second battery power signal.

19. The integrated circuit of claim 1, where the first output power and the second output power are simultaneously and independently provided to separate loads.

20. In a power management integrated circuit, a method for controlling electrical power, the method comprising:

receiving a first battery power signal characterized by a first battery voltage from a first battery;

outputting a first regulated power signal, based at least in part on the first battery power signal, that corresponds to a first output power characterized by a first output voltage;

receiving a second battery power signal characterized by a second battery voltage from a second battery, wherein the second battery voltage is substantially different from the first battery voltage; and outputting a second regulated power signal based at least in part on the second battery power signal, that corresponds to a second output power characterized by a second output voltage, wherein the first battery and the second battery have substantially different respective nominal voltage levels.

21. The method of claim 20, further comprising:

receiving input power from a power source;

generating a first battery-charging signal, based at least in part on the received input power, that corresponds to first charging power at a first charging voltage utilized to charge the first battery;

while generating the first battery-charging signal, generating a second battery-charging signal, based at least in part on the received input power, that corresponds to second charging power at a second charging voltage utilized to charge the second battery, the second charging voltage substantially different from the first charging voltage; and outputting the first and second battery-charging signals.

22. The method of claim 21, further comprising:

receiving a third battery power signal characterized by the second battery voltage from the second battery; and outputting a third regulated power signal, based at least in part on the third battery power signal, that corresponds to a third output power characterized by a third output voltage.

23. The method of claim 21, further comprising:

receiving a first control signal from monitor circuitry external to the integrated circuit;

determining the first battery-charging signal based, at least in part, on the first control signal;

receiving a second control signal from monitor circuitry external to the integrated circuit;

determining the second battery-charging signal based, at least in part, on the second control signal; and outputting the first and second battery-charging signals.

24. The method of claim 21, further comprising:

receiving first control data from a source external to the integrated circuit;

determining the first battery-charging signal based, at least in part, on the first control data;

receiving second control data from a source external to the integrated circuit;

determining the second battery-charging signal based, at least in part, on the second control data; and outputting the first and second battery-charging signals.

25. The method of claim 20, further comprising:

receiving a third battery power signal characterized by the second battery voltage from the second battery; and outputting a third regulated power signal, based at least in part on the third battery power signal, that corresponds to a third electrical power characterized by a third output voltage.

26. The method of claim 25, wherein the third output voltage, second output voltage and first output voltage are substantially different from each other.

27. The method of claim 20, wherein the second output voltage is substantially different from the first output voltage.

28. The method of claim 20, wherein the first regulated power signal comprises the first output power characterized by the first output voltage.

29. The method of claim 20, wherein the first regulated power signal, when applied to an external electrical circuit coupled to the integrated circuit, causes the external electrical circuit to output the first output power.

30. The method of claim 29, wherein the external electrical circuit comprises electrical components in one of a buck configuration and a boost configuration.

31. The method of claim 20, where the first output power and the second output power are simultaneously and independently provided to separate loads.

32. A portable electrical system comprising:

a first battery that operates to output a first battery power signal characterized by a first battery voltage, the first battery characterized by a first nominal voltage level;

a second battery that operates to output a second battery power signal characterized by a second battery voltage that is substantially different from the first battery voltage, the second battery characterized by a second nominal voltage level that is substantially different from the first nominal voltage level;

a power management integrated circuit comprising:

a first voltage regulator module that operates to receive the first battery power signal and output a first regulated power signal, based at least in part on the first battery power signal, that corresponds to a first output power characterized by a first output voltage; and a second voltage regulator module that operates to receive the second battery power signal and output a second regulated power signal, based at least in part on the second battery power signal, that corresponds to a second output power characterized by a second output voltage;

a first load that operates to receive and utilize the first output power; and a second load that operates to receive and utilize the second output power.

33. The electrical system of claim 32, wherein the integrated circuit further comprises a battery-charging module that operates to, at least:

receive input power from a power source;

output a first battery-charging signal, based at least in part on the received input power, that corresponds to first charging power at a first charging voltage utilized to charge the first battery; and output a second battery-charging signal, based at least in part on the received input power, that corresponds to second charging power at a second charging voltage utilized to charge the second battery, the second charging voltage substantially different from the first charging voltage.

34. The electrical system of claim 32, wherein the integrated circuit further comprises a third voltage regulator module that operates to receive the second battery power signal and output a third regulated power signal, based at least in part on the second battery power signal, that corresponds to a third electrical power characterized by a third output voltage.

35. The electrical system of claim 32, wherein the first output voltage used to power the first load is substantially different than the second output voltage used to power the second load.

36. The electrical system of claim 35, wherein
the first nominal voltage level of the first battery is selected to permit the first voltage regulator to efficiently output the first output voltage of the first output power to the first load, and
the second nominal voltage level of the second battery is selected to permit the second voltage regulator to efficiently output the second output voltage of the second output power to the second load.

37. The electrical system of claim 35, wherein
the first nominal voltage level of the first battery is substantially equal to the first output voltage of the first output power, and
the second nominal voltage level of the second battery is substantially equal to the second output voltage of the second output power.

38. The electrical system of claim 35, wherein
an insubstantial disparity exists between the first nominal voltage level of the first battery and the first output voltage of the first output power, and
an insubstantial disparity exists between the second nominal voltage level of the second battery and the second output voltage of the second output power.

* * * * *